United States Patent [19]

Wadia

[11] 4,217,482
[45] Aug. 12, 1980

[54] ELECTRIC COOKING APPARATUS WITH SAFETY CONTROL

[75] Inventor: Gurinder S. Wadia, Harwood Heights, Ill.

[73] Assignee: McGraw-Edison Company, Elgin, Ill.

[21] Appl. No.: 797,060

[22] Filed: May 16, 1977

[51] Int. Cl.$^2$ ............................................. H05B 1/02
[52] U.S. Cl. ................................... 219/494; 219/489; 219/441; 219/435; 99/325; 99/329 R; 99/337
[58] Field of Search ............... 219/489, 436, 490, 494, 219/503, 510, 441, 442, 503, 506; 99/325, 329, 327, 331, 337, 411, 403

[56] References Cited

U.S. PATENT DOCUMENTS

| | | | |
|---|---|---|---|
| Re. 29,609 | 4/1978 | Wadia et al. | 219/441 |
| 2,624,825 | 1/1953 | Growley | 219/494 X |
| 3,824,373 | 7/1974 | Napier | 219/494 |
| 3,877,359 | 4/1975 | Keating | 99/337 |
| 3,919,523 | 11/1975 | Wadia et al. | 219/441 |
| 3,938,498 | 2/1976 | Price | 219/441 |

Primary Examiner—B. A. Reynolds
Assistant Examiner—M. H. Paschall
Attorney, Agent, or Firm—Ronald J. LaPorte; Jon Carl Gealow; Roy A. Ekstrand

[57] ABSTRACT

A control circuit useful in commercial cooking appliances, such as deep fat fryers, having electric heating elements and separate operating and safety controls including full power transmitting contactors for independently energizing and/or deenergizing the heating elements. The simplified control is economical, but reliable, and utilizes the safety control contactor connected in series power circuit with the heating elements and a single relay to establish both an on operating circuit for normal cooking conditions where the operating control cycles on and off to maintain the desired operating temperatures and a safety circuit that deenergizes all heating elements should an overheat condition occur and further that requires manual release or reset to again render the appliance operative.

10 Claims, 1 Drawing Figure

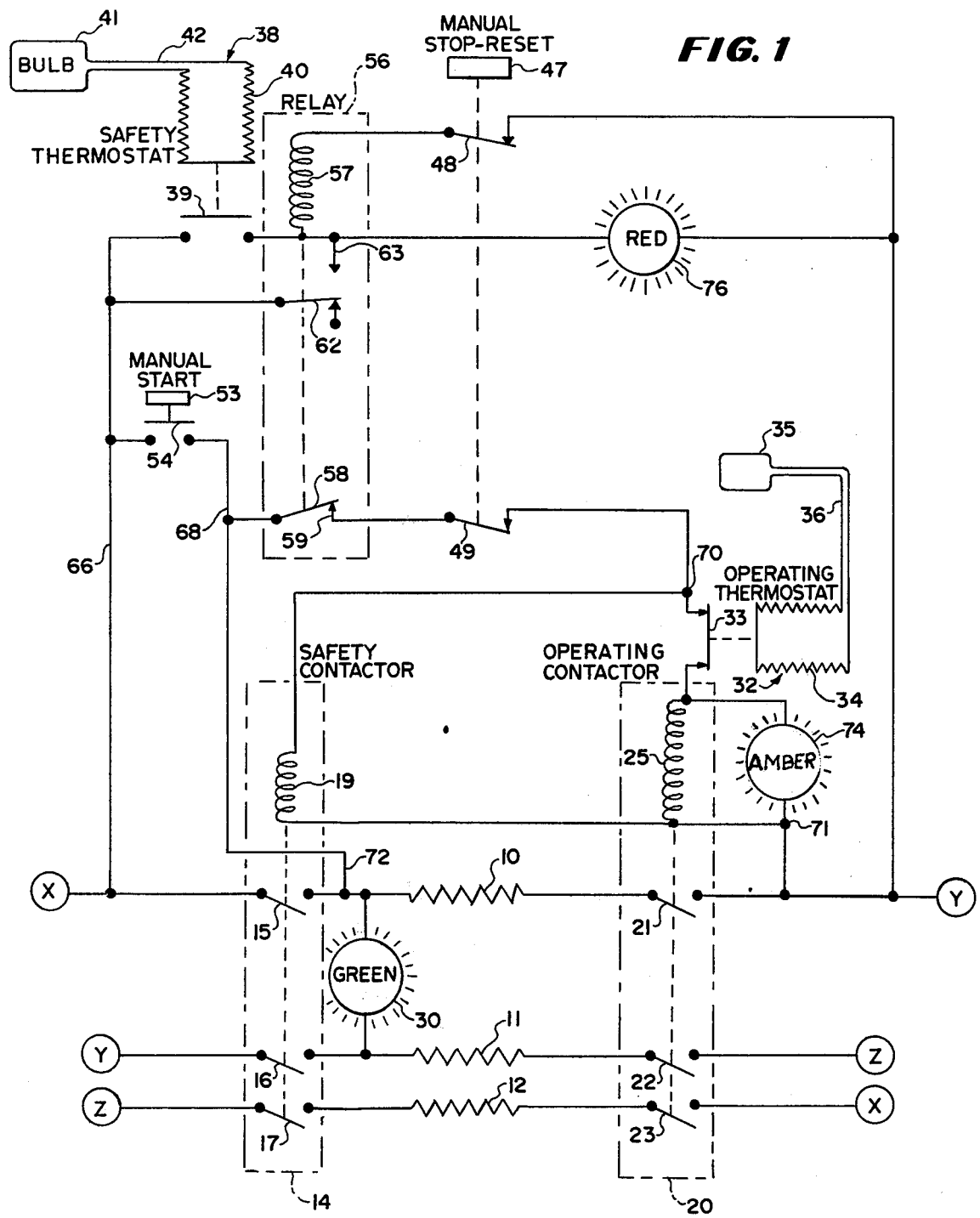

ELECTRIC COOKING APPARATUS WITH SAFETY CONTROL

BACKGROUND OF INVENTION

In commercial cooking equipment having electric heating elements, electrically actuated contactors are connected in series with the heating elements to make or break power circuits through them. A first temperature control device opens and closes one of the contactors to deenergize and energize the heating elements in order to maintain the cooking temperature desired by the operator. In addition, a second temperature control device serves as a safety control to open the other contactor and deenergize the heating elements should some malfunctioning of the first control device occur and the cooking temperature exceeds the determined safe limit.

U.S. Pat. No. 3,824,373 issued July 16, 1974 to Clarence H. Napier illustrates an operating control circuit for a deep fat fryer having these components, but the safety thermostat and contactor are not energized on a regular basis so that malfunctioning thereof could occur without detection to frustrate the safety control and even allow damage and/or a fire as a result.

U.S. Pat. No. 3,919,523 issued Nov. 11, 1975 to Wadia et al. teaches an improved circuit where the safety contactor is operated each and every time main power connected to the unit is interrupted by a manual stop control. This tests the safety control regularly, in effect, every day when the unit is shut off. An indicator light connected across power lines between the safety contactor and the heating elements is illuminated in the safety contactor closed condition to apprise the operator of the faulty safety control.

Two embodiments are disclosed in the Wadia et al. patent. The first embodiment includes a one way safety thermostat device that requires manual resetting of the contacts once they have been shifted responsive to an overheat condition, and the second embodiment provides a pair of relays that respectively maintain the operating circuit energized until an overheat condition occurs and maintain the safety circuit energized thereafter until a manual reset step occurs. This manual reset feature is a major advantage of the safety control since it renders the appliance inoperative once an overheat condition occurs and the operator is thereby apprised of the overheat situation.

Using a reset type thermostat by itself on certain cooking appliances does present an additional safety problem because of the location required for the reset button. For example, a standard hydraulic thermostat device has a switch contact assembly including an actuating bellows and tubing connecting the bellows to a temperature sensing bulb. In a deep fat fryer where the heating elements are intended to be covered by cooking fat, the sensing bulb is carried on the heating element to detect both the fat temperature and the temperature of the heating elements in a no or low fat condition. To allow for easy cleaning of the cooking container, the heating elements are mounted from a movable rear housing of the fryer and this requires the contact assembly also to be mounted on this movable housing to avoid repeated flexing of the connecting tubing between the bulb and bellows. With the thermostat reset button mounted on the rear fryer housing, the operator must reach across and over the hot cooking fats in order to manipulate the reset button.

The relay control allows varied and safer mounting locations of the manual on/off reset actuators relative to the physical location of the thermostats since only flexible electrical wires are required to operatively connect the components together. The previously patented Wadia et al. control relay concept, however, requires two such relays.

SUMMARY OF INVENTION

The subject invention relates to a control circuit useful in commercial type cooking appliances having a separate control and a separate safety control where each independently operates for energizing and/or deenergizing the appliance heating elements. The disclosed simplified control is economical, but reliable, and utilizes a single relay and the safety contactor itself for establishing both an on operative condition and a safety off inoperative condition needing manual reset to again use the unit.

BRIEF DESCRIPTION OF THE DRAWING

The features of this invention which are believed to be novel are set forth with particularity in the appended claims. The invention, together with its further objects and the advantages thereof, may be best understood, however, by reference to the following description taken in conjunction with the accompanying drawing in which reference numerals identify the several elements and in which the single FIGURE, FIG. 1, is a control circuit, shown in schematic form, illustrating the various components of a commercial deep fat fryer, connected in a preferred embodiment of the subject invention.

DETAILED DESCRIPTION

The structural components of a commercial deep fat fryer in which the subject invention may be utilized are illustrated, for example, in Wadia et al. U.S. Pat. No. 3,919,523, previously mentioned.

By way of example, the structural components in such a deep fat fryer include the fryer frame, a container supported by the frame, and electric heating elements likewise supported by the frame and movable to within the cooking container to heat cooking fat therein. Typically, an operating thermostat and a safety thermostat are also provided, each thermostat comprising a sensing bulb secured onto the heating element and located in the cooking fat to detect the temperatures thereof, a contact assembly mounted on the frame, and connecting tubing between the contact assembly and the bulb. Manual start/stop reset controls are likewise conveniently mounted on the fryer frame.

As illustrated in the drawing, electrical power is coupled to the three-phase power input lines X, Y and Z of the appliance and line potential exists across any different pair thereof. The power lines are connected in series with heating elements 10, 11 and 12 and with a safety contactor 14 having individual contacts 15, 16 and 17 and an operating contactor 20 having individual contacts 21, 22 and 23, the individual contacts being spring biased to a normally open position. The contactors 14 and 20 also have respective coils, 19 and 25, which, when electrically actuated, close the respective contacts of the contactors.

Accordingly, when the respective contacts of the safety contactor 14 and the operating contactor 20 are closed, the heating elements 10, 11 and 12 are energized. A green neon glow bulb 30 connected across lines X and Y between the safety contactor contacts 15 and 16 and the respective heating elements 10 and 11 is illuminated when the contacts 15 and 16 are closed to thereby indicate a power "on" condition or a "faulted" closed condition of the contactor.

An operating thermostat 32 and a safety thermostat 38 have respective moving contacts, 33 and 39, which are shifted between the closed and open positions by respective fluid operated bellows, 34 and 40. Each of the thermostats, 32 and 38, further includes a sensing bulb 35 and 41, respectively, which communicates with the corresponding bellows via respective tubings, 36 and 42, to determine the effective sensed temperature, the fluid pressure within the bellows corresponding to the temperature. This construction is typical in the cooking art for thermostat devices of the type noted, but could be replaced by other controls, for example, of solid state construction.

The control further includes manual start and manual stop-reset devices. The stop-reset device has a manual actuator 47 which can be depressed to open two contacts 48 and 49 that are normally spring biased closed. The start device likewise has a manual actuator 53 which can be momentarily depressed to close normally open contact 54.

The subject control further utilizes a single relay 56 which has a coil 57 and a pair of moving leafs 58 and 62. The leaf 58 is normally spring biased against contact 59 when the relay is deenergized; whereas leaf 62 is normally spring biased open when the relay is deenergized and is shifted against contact 63 upon energization of the coil 57.

In normal use, the temperature sensed in the cooking environment would be less than the overheat temperature of safety thermostat 38 and contact 39 would be open. To start the cooking cycle, the "start" control is actuated by manual depression of the actuator 53 to close the contacts 54 momentarily. This completes a circuit between power lines X and Y through line 66, closed contact 54, terminal 68, normally closed contacts 58, 59 of relay 56, normally closed contact 49 of the stop-reset control, terminal 70, and coil 19 of the safety contactor 14 to actuate the safety contactor 14 to close contacts 15, 16 and 17. After the actuator 53 is released, the safety contactor 14 is maintained closed by a circuit from the X power line to terminal 68 comprising the closed contactor contact 15 and line 72, the circuit continuing through the closed relay contact elements 58, 59, stop-reset control contact 49, and the contactor coil 19 as above noted.

If the temperature in the cooking environment is less than that set for the operating thermostat 32, then the contact 33 is closed so that the operating contactor coil 25 is also energized to close the operating contactor contacts 21, 22 and 23. This simultaneous closure of the contactors 14 and 20 energizes the heating elements 10, 11 and 12. The indicator light 30, as above noted, is illuminated, and likewise an amber indicating light 74 connected across the operating contactor coil 25 is illuminated, indicating the operating contactor is energized.

When the cooking temperature sensed by the operating thermostat 32 reaches the desired level, contact 33 opens to deenergize the operating contactor coil 25 and allow the contacts 21, 22 and 23 to open. This deenergizes the heating elements 10, 11 and 12 and the amber indicating light 74. The green light 30 remains energized indicating that power is yet on in the operate circuit. Under normal operating conditions therefore, the operating thermostat 32 cycles to open and close the operating contactor contacts to energize and deenergize the heating elements in order to maintain the desired cooking temperature.

The cooking cycle can be stopped manually by the stop-reset device, upon depression of the actuator 47, which opens the normally closed switch contact 49. This interrupts the operate circuit through the closed safety contactor contact 15, line 72, the contact 15, line 72, the closed relay contactor 58, and the closed stop-reset contact 49 to the safety contactor coil 19 to deenergize the contactor 14 and allow the contact 15 to open. Even through the reset contact 49 would once again be spring closed, coil 19 once being deenergized will not become energized again until the "start" device 54 is closed. The interrupted operate circuit also opens or maintains open the operating contactor 20 to provide that heating elements 10, 11 and 12 become or remain deenergized.

The operate control may also be deenergized upon the occurrence of an overheat condition causing the safety thermostat contact 39 to close and complete a circuit between the X and Y potentials via line 66 through the relay coil 57 and the normally closed contact 48 of the stop-reset device. The energized coil 57 of relay 56 thus shifts the contacts 58 and 62, and the opened contact 58 breaks the operate circuit through the contactor coils 19 and 25 to allow the contactor contacts to open for complete deenergization of the heating elements 10, 11 and 12. The contact 62 is also shifted against contact 63 to complete a circuit through the relay coil 57 to maintain the relay 56 energized through the manual reset device contact 48. Thus, notwithstanding the safety thermostat 38 cooling to where the contact 39 once again opens, the safety hold circuit remains energized until the reset switch 48 is opened. Even closure of the "start" device contact 54 is ineffective to restart the cooking cycle since the energized relay holds contact 58 open. A red indicator light 76 connected in parallel with the relay coil 57 indicates that the safety thermostat has cycled and that the safety hold relay is yet energized.

To deenergize the safety hold relay 56, the reset actuator 47 must be depressed to open contact 48 in circuit with the coil 57, whereupon relay contacts 58 and 62 return to the positions shown in the drawing. However, the manual reset is only effective when the safety thermostat contact 39 is open, signifying cooking environment cooling to below the overheat condition, since otherwise immediately upon releasing the manual reset actuator 47 the closed safety thermostat contact 39 would reenergize the relay coil 57.

The particular control illustrated allows flexibility in positioning the start and stop-reset control components regardless of where the thermostat control components are located, while further uniquely using the contact of the safety contactor itself for maintaining a normal operate condition circuit.

While a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

What is claimed is:

1. In a cooking appliance having electric heating means and separate operating and safety contactors, each of said contactors having separable contact means connected in series with the heating means and each of said contactors having coil means that when energized close the contact means, and further having an operating thermostat effective with the operating contactor to cycle the heating means on and off to maintain the desired cooking temperature and further having a safety thermostat effective with the safety contactor to render the appliance inoperable in the event of a malfunctioning overheat condition, and further having a manual start actuator having normally open contact means and stop and reset actuators having normally closed contact means, the improvement comprising the combination of a control having a normally open contact means and a normally closed contact means and an actuating coil that when energized shifts and holds the said contact means to and in the closed and open conditions respectively, a first circuit including the start actuator and the normally closed contact means of the control, said first circuit being operable to energize the safety contactor coil means and initially close the contact means of the safety contactor upon momentary closure of the normally open start actuator contact means; a second circuit including the initially closed contact means of the safety contactor, the normally closed contact means of the control, and the normally closed contact means of the stop actuator, said second circuit being operable to maintain the safety contactor coil energized through the closed contact means of the safety contactor upon the initial closure of said safety contactor contact means by said first circuit; a third circuit including the safety thermostat contact means operable to energize the coil of the control and open the normally closed contact means of the control in said second circuit and deenergize the safety contactor coil to open the safety contactor contact means, said coil also closing the normally open contact means of the control; and a fourth circuit including the closed normally open contact means of the control and the normally closed contact means of the reset actuator operable to maintain the coil of the control energized.

2. In a cooking appliance having electric heating means and separate operating and safety contactors, each of said contactors having normally open contact means connected in series with the heating means and coil means that when energized close the contact means, means including an operating thermostat for energizing and deenergizing the operating contactor coil to cycle the heating means on and off to maintain the desired cooking temperature, a safety thermostat cooperating with the safety contactor to render the appliance inoperable in the event of a malfunctioning overheat condition, and manual start and reset actuators, the improvement comprising the combination of a first circuit completed upon momentary actuation of the start actuator and operable to energize the safety contactor coil means for initially closing the safety contactor contact means; a second circuit including the safety contactor contact means completed upon the closing of the safety contactor contact means and operable to maintain the safety contactor coil energized; a third circuit completed upon the safety thermostat shifting responsive to an overheat condition and operable to deenergize the second circuit; and a fourth circuit operable to maintain the second circuit deenergized until said fourth circuit is deenergized by the reset actuator.

3. In a cooking appliance adapted for connection to a source of electrical power establishing an electric potential between input power lines of said appliance and wherein said appliance includes electric heating means and separate operating and safety contactor means coupled in series between said input power lines, said safety contactor means having normally open contact means coupled in series with said electric heating means and coil means adapted to close said normally open safety contactor contact means and allow energization of said heating means during normal operation of said appliance below a predetermined overheating temperature level, and said operating contactor means being thermostatically controlled to open and close to maintain said electric heating means at a desired cooking temperature when said safety contactor contact means are closed, the improvement comprising:

actuator means having normally open contact means coupled in series with said safety contactor coil means between said input power lines, said actuator means being manually operable to momentarily close said actuator contact means for energization of said safety contactor coil means to initially close said safety contactor contact means;

means comprising an electrical operating circuit coupling said safety contactor coil means and said safety contactor contact means between said input power lines, said operating circuit bypassing said actuator means and maintaining said safety contactor coil means energized through said closed safety contactor contact means upon the reopening of said actuator contact means;

relay means having normally closed first contact means interposed in said operating circuit and normally open second contact means coupled between said input power lines, said relay means further having coil means adapted to simultaneously open said first relay contact means and close said second relay contact means;

safety thermostat means having normally open contact means interposed in series with said relay coil means between said input power lines and in parallel with said normally open second relay contact means and further having temperature responsive means for closing said safety thermostat contact means to energize said relay coil means responsive to said cooking temperature exceeding said overheating temperature level, said first relay contact means being opened upon energization of said relay coil means to deenergize said safety contactor coil means and open said safety contactor contact means, said relay coil means simultaneously closing said second relay contact means to maintain said relay coil means energized independently of said safety thermostat means; and stop/reset means having normally closed first contact means interposed in series with said safety thermostat contact means and said relay coil means between said input power lines and having normally closed second contact means interposed in said operating circuit, said stop/reset means being manually operable to momentarily open said first stop-reset contact means and deenergize said relay coil means to open said second relay contact means, said relay coil means remaining deenergized if said safety thermostat contact means have opened responsive to said cooking temperature having dropped below said overheating temperature level and said first relay contact means closing to permit resumption of normal operation upon momentary closure of said actuator contact means, said stop-reset means also being manually operable during normal operation to momentarily open said normally closed second stop-reset contact means and deenergize said safety contactor coil means.

4. The improvement in accordance with claim 3 wherein said operating contactor means comprises normally open contact means coupled in series with said electric heating means and coil means adapted to close said normally open operating contactor contact means and allow energization of said heating means during normal operation of said appliance below said overheating temperature level, said safety contactor coil means and said operating contactor coil means being coupled in parallel between said input power lines in said operating circuit, said operating contactor coil means being initially energized through said momentarily closed actuator contact means and thereafter through said operating circuit upon the reopening of said actuator contact means to close said normally open operating contactor contact means, said operating contactor coil means being deenergized and said operating contactor contact means opening upon said first relay contact means being opened or upon said second stop-reset contact means being momentarily opened.

5. The improvement in accordance with claim 4 including an operating thermostat having normally closed contact means interposed in series with said operating contactor coil means, said operating thermostat having temperature responsive means for opening and closing said operating thermostat contact means to deenergize and energize said operating contactor coil means and maintain said heating elements at said desired cooking temperature.

6. The improvement in accordance with claim 4 including first indicator means coupled in parallel with said operating contactor coil means for indicating whether said operating contactor coil means is energized.

7. The improvement in accordance with claim 3 including second indicator means coupled in parallel with said relay coil means and said first stop-reset contact means for indicating that said appliance has reached said overheating temperature level and that said relay coil means is energized.

8. The improvement in accordance with claim 3 including third indicator means coupled between said input power lines intermediate said safety contactor contact means and said heating means for indicating that said safety contactor contact means are closed.

9. The improvement in accordance with claim 3 wherein said actuator contact means are coupled to said operating circuit in parallel with said safety contactor contact means.

10. The improvement in accordance with claim 3 wherein said relay means comprises a single relay device.

* * * * *